(12) United States Patent
Kawakami et al.

(10) Patent No.: US 7,539,114 B2
(45) Date of Patent: May 26, 2009

(54) RECORDING APPARATUS AND RECORDING METHOD

(75) Inventors: Hiro Kawakami, Kanagawa (JP); Yukio Shishido, Kanagawa (JP); Taku Watanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 494 days.

(21) Appl. No.: 10/918,345

(22) Filed: Aug. 16, 2004

(65) Prior Publication Data

US 2005/0068865 A1 Mar. 31, 2005

(30) Foreign Application Priority Data

Aug. 18, 2003 (JP) .............................. 2003-294261

(51) Int. Cl.
G11B 7/00 (2006.01)
(52) U.S. Cl. .................... 369/94; 369/47.1; 369/53.1
(58) Field of Classification Search ............. 369/47.22, 369/94, 59.2, 5, 47.1, 47.27, 275.3, 44.26, 369/53.1, 53.22, 53.41
See application file for complete search history.

(56) References Cited

U.S. PATENT DOCUMENTS

| | | | | |
|---|---|---|---|---|
| 5,930,225 | A * | 7/1999 | Ishida et al. ............... | 369/275.1 |
| 6,656,560 | B2 * | 12/2003 | Yamamoto et al. ......... | 428/64.4 |
| 6,850,469 | B2 * | 2/2005 | Ogawa et al. ............. | 369/47.22 |
| 7,072,255 | B2 * | 7/2006 | Sasaki ....................... | 369/47.1 |
| 7,177,256 | B2 * | 2/2007 | Motohashi ................ | 369/59.25 |
| 7,184,377 | B2 * | 2/2007 | Ito et al. .................... | 369/47.14 |
| 2004/0264339 | A1 * | 12/2004 | Miyagawa et al. ............ | 369/94 |

FOREIGN PATENT DOCUMENTS

| | | |
|---|---|---|
| EP | 08 212 561 | 8/1996 |
| EP | 08 287 474 | 11/1996 |
| EP | 1 191 524 A1 | 3/2002 |
| EP | 1 329 880 A2 | 7/2003 |
| EP | 1 607 967 A1 | 12/2005 |
| JP | 9-069264 | 3/1997 |
| JP | 2002-208142 | 7/2002 |
| JP | 2003-115119 | 4/2003 |
| JP | 2004-310996 | 11/2004 |

OTHER PUBLICATIONS

Patent Abstracts of Japan, JP 08-212561, Aug. 20, 1996.
Patent Abstracts of Japan, JP 08-287474, Nov. 1, 1996.

* cited by examiner

*Primary Examiner*—Nabil Z Hindi
(74) *Attorney, Agent, or Firm*—Oblon, Spivak, McClelland, Maier & Neustadt, P.C.

(57) ABSTRACT

User data is recorded in succession to the recording of a guard block on a next recording layer when the user data is recorded with a recording position shifted from one recording layer to the next recording layer. If a record start position of the user data is learned beforehand in the next recording layer, the guard block is formed on the next recording layer prior to the recording of the user data. In other words, when recording layer shifting is performed, an area ahead of the recording position of the user data becomes the guard block so that a replay signal for use in a pre-replay process is obtained beforehand in the replaying of the user data.

13 Claims, 14 Drawing Sheets

FIG. 2

| 1st PSN | Size (NO. OF SECTORS) | Description |
|---|---|---|
| 1F300h | 45440 | Initial Zone |
| 2A480h | 2048 | Inner Disc Test Zone |
| 2AC80h | 12288 | Inner Drive Test Zone Layer0 |
| 2DC80h | 512 | Guard Zone 1 |
| 2DE80h | 4096 | Reserved Zone 1 |
| 2EE80h | 64 | Reserved Zone 2 |
| 2EEC0h | 256 | Inner Disc Identification Zone |
| 2EFC0h | 64 | Reserved Zone 3 |
| 2F000h | 32 | Reference Code Zone |
| 2F020h | 480 | Buffer Zone 1 |
| 2F200h | 3072 | Control Data Zone |
| 2FE00h | 32 | Buffer Zone 2 |

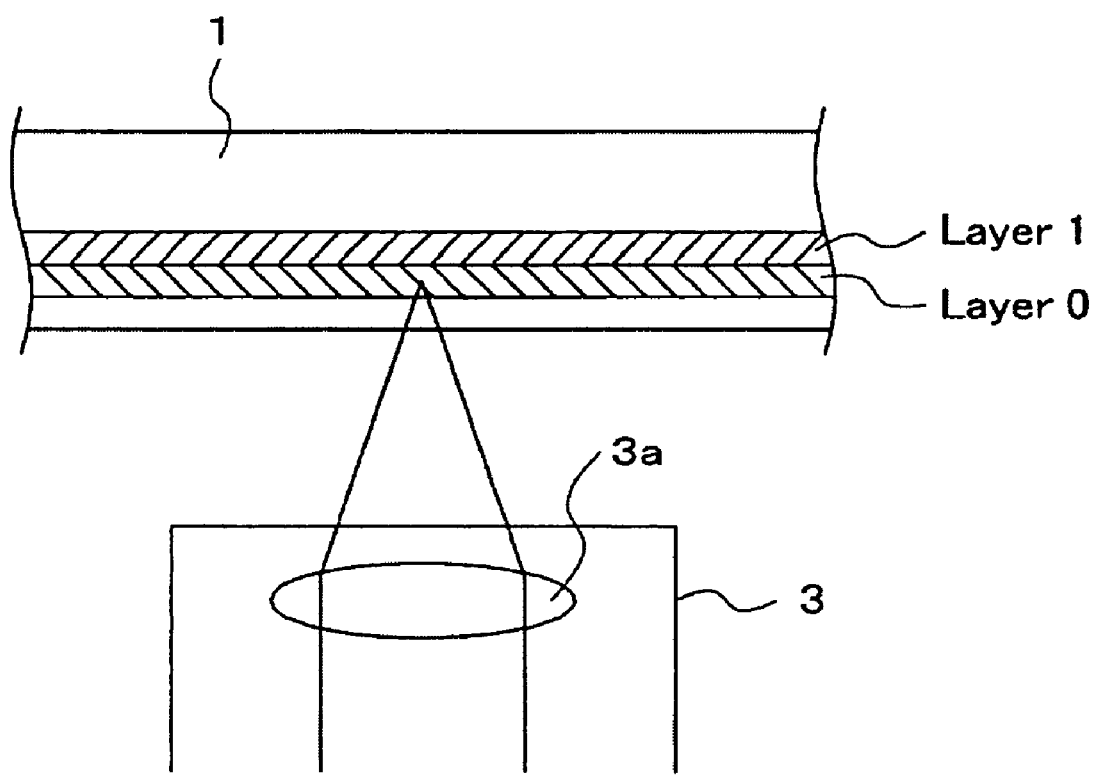

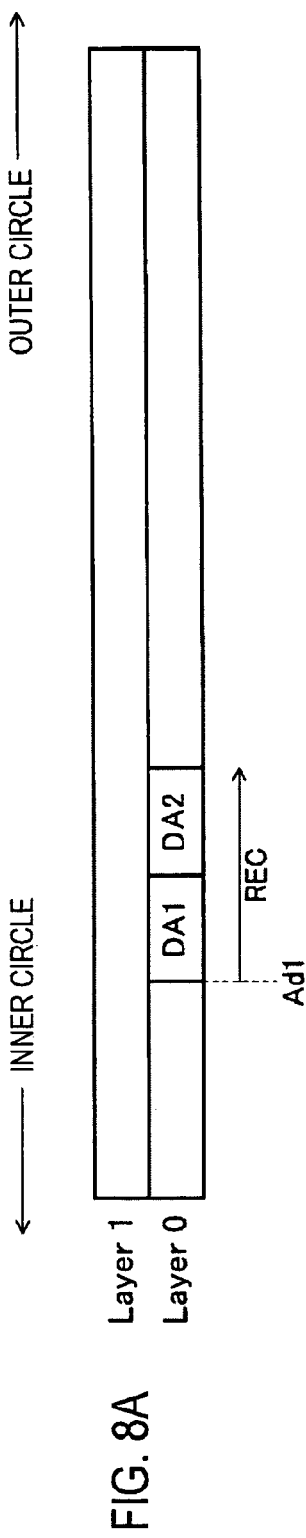
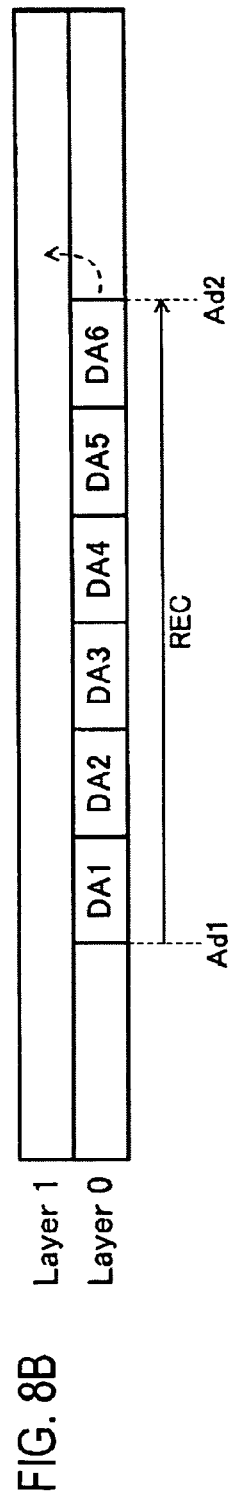
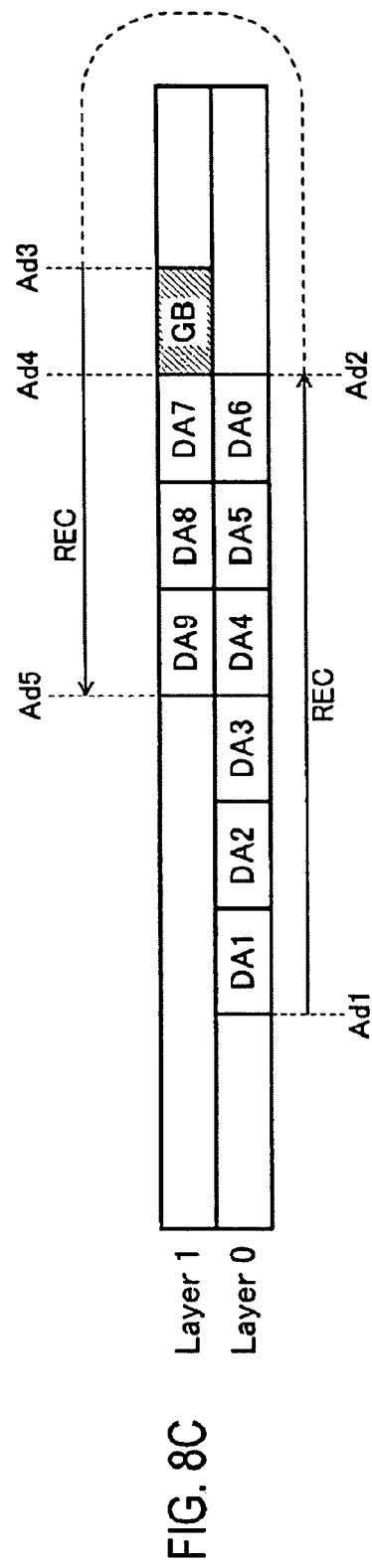
FIG. 8A
FIG. 8B
FIG. 8C

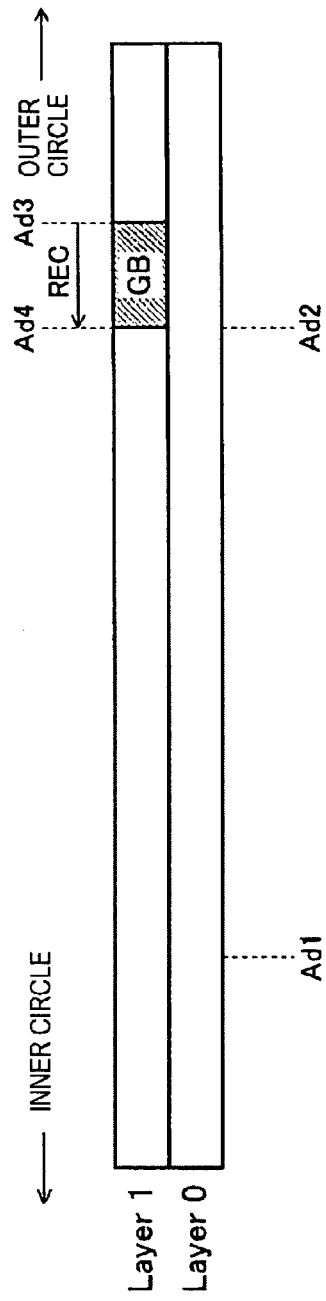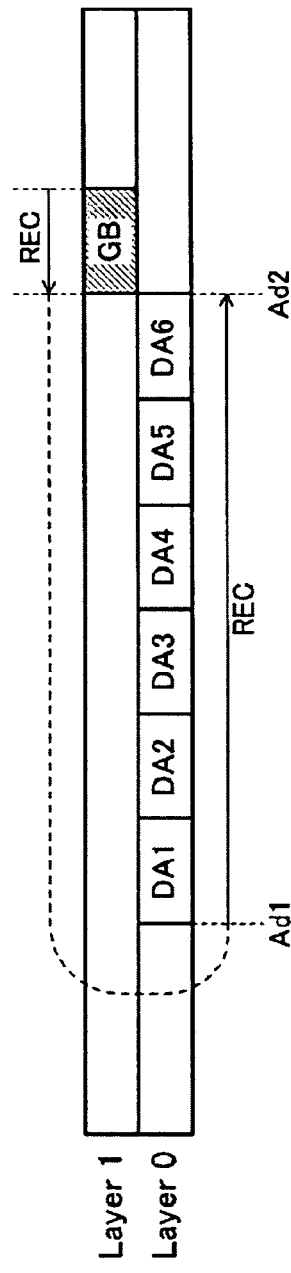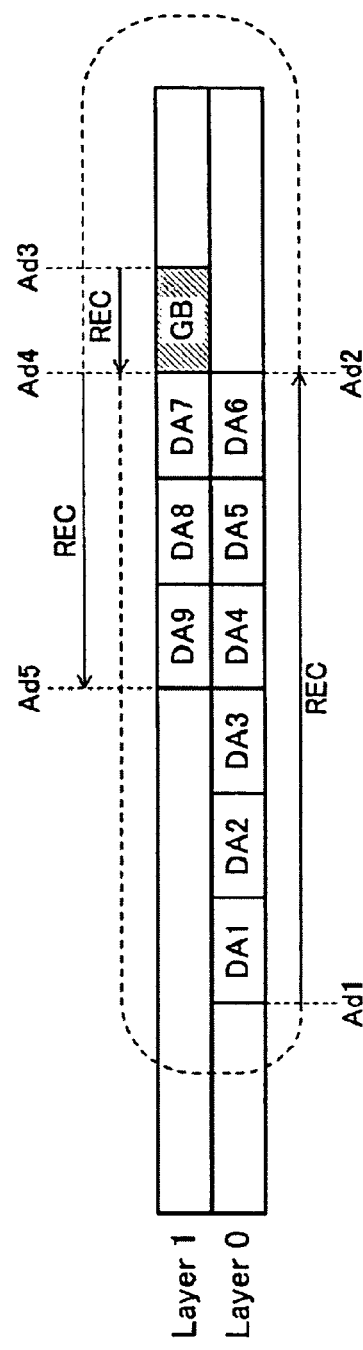

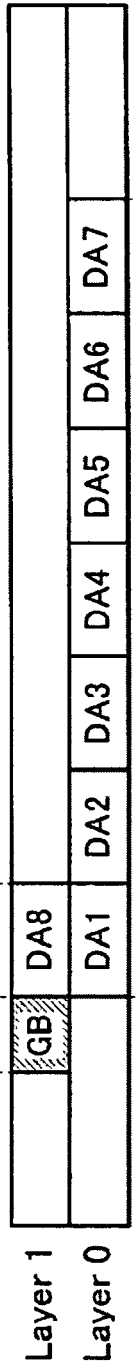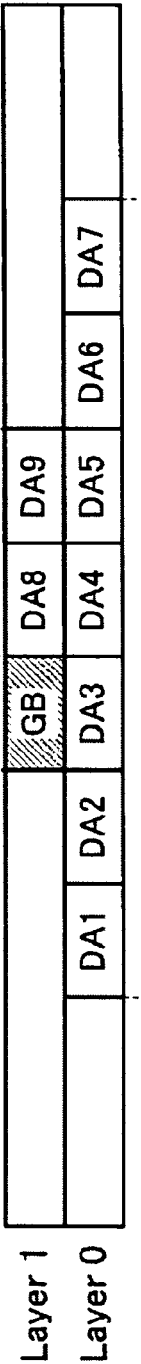
FIG. 12A
FIG. 12B

FIG. 13A

| | | | | | | | | | |
|---|---|---|---|---|---|---|---|---|---|
| Layer 2 | GB | DA13 | DA14 | DA15 | DA16 | | | | |
| Layer 1 | | DA12 | DA11 | DA10 | DA9 | DA8 | DA7 | GB | |
| Layer 0 | | DA1 | DA2 | DA3 | DA4 | DA5 | DA6 | | |

← INNER CIRCLE    OUTER CIRCLE →

FIG. 13B

| | | | | | | |
|---|---|---|---|---|---|---|
| Layer 2 | GB | DA5 | DA6 | DA7 | | |
| Layer 1 | | DA4 | DA3 | DA2 | DA1 | |
| Layer 0 | | | | | | |

RECORDING APPARATUS AND RECORDING METHOD

BACKGROUND OF THE INVENTION

1. Field of the Invention

The present invention relates to a recording apparatus and a recording method for recording information onto a plurality of information recording layers.

2. Description of the Related Art

Known as optical recording media for optically recording and/or replaying information are an optical disk, an optical card, etc. A semiconductor laser is used as a light source on the optical recording medium. A sharp laser beam, converged through a lens, is directed on the disk to record and/or replay information.

Techniques have been developed to increase recording capacity of such an optical recording medium. The effort to increase information recording density on a conventional optical disk focuses on increasing recording density on a disk recording surface. For example, a track pitch of the optical disk is narrowed in combination with the use of short wavelength of recording light and a signal process of a replay system. The information recording density in a linear direction is increased in a scan for recording and reading operations.

The use of the short wavelength of the light beam is limited to ultraviolet range. Even if an attempt is made to reduce the size of pits in the disk, the size is still limited to the size of the pit that is transferable to the disk in a cutting operation. The attempt to increase the recording density is thus expected to be subject to limitations at any rate in a two-dimensional region of the disk.

The capacity increasing technique is expanded to a three-dimensional structure. Multi-layer disks now draw attention. The multi-layer disk has information recording layers to increase information recording density in the direction of thickness thereof, draw attention.

A multi-layer recording medium with recording layers laminated thereon enables the recording capacity to be increased in accordance with the number of recording layers. A high-density recording medium is easily produced by combining the multi-layer technique with another high density recording technique. The multi-layer recording media are already commercially available as a digital versatile disk (DVD)-ROM as a read-only optical disk.

For example, U.S. Pat. No. 6,061,310 and U.S. Pat. No. 6,330,212 disclose techniques that are applicable to a two-layer structure in a DVD-ROM.

The development and use of a multi-layer recording medium having laminated recording layers made of a recording material such as a phase change material, a magneto-optical material, or a dye material are expected in addition to the ROM type disk. For example, the employment of multi-layers is expected in the DVD-type disks including write-once-type disks called DVD–R and DVD+R, and rewritable-type disks called DVD–RW and DVD+RW.

In the multi-layer recording medium, layer shifting is performed during a recording operation. In the case of two layers, for example, data recording is performed first on a first layer (layer 0), and continuously performed on a second layer (layer 1). If consecutive pieces of user data are recorded straddling across layer 0 and layer 1, replay of the data from layer 1 is subject to a problem. FIG. 14 illustrates this problem.

As shown, a series of user data DA1-DA8 is consecutively recorded across two layers of layer 0 and layer 1.

User data recording starts with user data DA1 on layer 0. When the recording area of layer 0 is fully used with data DA6 recorded, data recording resumes on layer 1 to record the remaining data DA7 and DA8.

It is now assumed that predetermined regions, such as a lead-in zone, a lead-out zone, and a middle area (all to be discussed later), are not formed yet. For example, in the write-once type disk, these regions are formed in a disk close (session close) process or a finalize process. FIG. 14 illustrates the disk that has undergone only user data writing prior to the disk close process.

The user data is now replayed under the state shown in FIG. 14.

When the close process is performed subsequent to the user data recording, management information based on the user data recorded on the disk is typically recorded and required regions are formed in the write-once disk and the rewritable disk. The disk is thus normally replayed on a replay only apparatus. Even in the state shown in FIG. 14, a recording apparatus that has recorded the data can replay the data. More specifically, the recording apparatus itself has recorded the data, and naturally holds information corresponding to the management information to be recorded in succession, and thus knows an address bearing the recorded user data.

The recording and replay apparatus having the user data recorded as shown in FIG. 14 may unload the disk with no close process performed taking into consideration additional recording. In such a case, management information corresponding to the user data recorded up to this point of time is recorded in a predetermined area of the disk, although this process is not the close process. A recording and replay apparatus compatible with such an unclosed disk can replay the user data from the unclosed disk with the user data recorded.

When such an unclosed disk is replayed, the replaying of layer 1 cannot be performed if the user data is recorded straddling across layer 0 and layer 1.

As shown in FIG. 14, data DA7 is recorded on layer 1 in succession to data DA6. During the replaying of the data DA7, a pickup of the apparatus accesses a head portion of the data DA7 in the layer 1, and starts replaying toward inner circles. An area immediately ahead of the data DA7 is in an unrecorded state. For a duration of time up to the head portion of the data DA7, no replay signal is available. In other words, only when the pickup reaches the head portion of the data DA7 in an access operation, a replay signal is obtained.

To be ready for replaying, the gain of a replay signal obtained from a reflected light beam is adjusted, a synchronization process for decoding the replay signal is performed, and PLL looping for generating a replay clock is performed. Only after these pre-replay processes, the replay signal is decoded. The pre-replay process cannot be performed without any replay signal.

If the replaying of the data DA7 in layer 1 is attempted, the replay signal is obtained when the pickup reaches the head portion of the data DA7. At this point of time, the pre-replay process is enabled. When the decoding operation is possible, the replay operation of the pickup is in progress finishing the head portion of the data DA7. The head portion of the data DA7 thus ends without being decoded.

For this reason, the user data of layer 1 cannot be appropriately replayed.

A guard block (not shown) for recording dummy data is typically formed prior to the start of the data recording.

As shown in FIG. 14, dummy data is recorded starting in a circle slightly inner than the head portion of the data DA1 when the data recording of the data DA1 starts in layer 0. Subsequent to the recording of the dummy data, the user data of the data DA1 is recorded. When the data DA1 is replayed in layer 0, a replay signal is obtained from the guard block of the dummy data, thereby allowing the pre-replay processes to be performed. The replay operation of the data DA1 is appropriately performed.

When a series of user data of data DA1 through DA8 is recorded on layer 1, a guard block is formed immediately ahead of the recording of the data DA1, and no problems take place in the replay operation.

A problem takes place in the replay operation when layer shifting is performed during the recording of a series of data, and when the user data has an unrecorded region immediately ahead thereof in a destination recording layer.

SUMMARY OF THE INVENTION

Accordingly, it is an object of the present invention to provide a recording apparatus that is free from malfunction when layer shifting is performed in the middle of recording user data in a multi-layer recording medium in use.

According to one aspect of the present invention, a recording apparatus using a recording medium having a plurality of data writable recording layers, includes a recording unit for recording data onto each of the recording layers, and a control unit for controlling the recording unit so that the recording unit forms a guard block in an area reaching a recording start position of user data in a next recording layer when a recording position is shifted from one recording layer to the next recording layer in a recording operation of the recording unit.

Preferably, the control unit forms the guard block on the next recording layer prior to the start of the recording of the user data in the next recording layer when the recording position is shifted to the next recording layer after the completion of the recording operation of the user data on the one recording layer.

Preferably, the recording apparatus further includes a detecting unit for detecting the record start position of the recording of the user data in the next recording layer prior to the recording of the user data, and the control unit forms the guard block prior to the start of the recording of the user data based on the record start position detected by the detecting unit.

According to another aspect of the present invention, a recording method using a recording medium having a plurality of data writable recording layers includes a first recording step for recording user data on one recording layer, a guard block forming step for forming a guard block on a next recording layer after the recording position is shifted to the next recording layer with the recording of the user data on the one recording layer completed, and a second recording step for recording the user data in succession to the guard block.

According to yet another aspect of the present invention, a recording method for using a recording medium having a plurality of data writable recording layers, includes a detecting step for detecting a record start position of user data on a next recording layer prior to the recording of the user data when a recording position shift from one recording layer to the next recording layer is predicted in a recording operation of the user data, a guard block forming step for forming a guard block beforehand on the next recording layer in response to the result of the detecting step, and a user data recording step for recording the user data on the one recording layer to the next recording layer.

When a user data recording position is shifted from one recording layer to the next recording layer, the guard block is first recorded followed by the recording of the user data. If the record start position of the user data is learned beforehand in the next recording layer, the guard block is formed in the next recording layer.

More specifically, when the user data recording position is shifted from one recording layer to the next recording layer, the area ahead of the recording position of the user data becomes the guard block in the next recording layer.

The area ahead of the recording position of the user data in the next recording layer does not become an unrecorded area but an area from where a replay signal available during replaying. When the user data recorded in the next recording layer is replayed, a pre-replay process is performed based on a replay signal from the guard block that is replayed prior to the replaying of the user data. The user data that has been recorded in the middle of the layer shifting is appropriately replayed.

The guard block is recorded prior to the recording of the user data on the next recording layer when the user data recording position is shifted from the one recording layer to the next recording layer. The guard block is thus formed at an appropriate location.

If the record start position of the user data is learned beforehand in the next recording layer, the guard block is formed prior to the recording of the user data in the next recording layer. This arrangement eliminates the need for interposing a guard block recording process in the middle of the user data recording operation, thereby allowing the user data to be continuously recorded.

BRIEF DESCRIPTION OF THE DRAWINGS

FIG. 2 lists lead-in zone information;

FIG. 3 illustrates a two-layer disk;

FIGS. 8A-8C illustrate a guard block formation in the user data recording process in accordance with the preferred embodiment of the present invention;

FIGS. 10A-10C illustrate the guard block formation in the other user data recording process in accordance with the preferred embodiment of the present invention;

FIGS. 12A and 12B illustrate the guard block formation in the parallel track path in accordance with the preferred embodiment of the present invention;

FIGS. 13A and 13B illustrate the guard block formation in a three-layer disk in accordance with the preferred embodiment of the present invention.

DESCRIPTION OF THE PREFERRED EMBODIMENTS

A digital versatile disk (DVD) is described here as a large-capacity recording medium. A disk drive apparatus to be discussed later records data on and/or replays data from the disk as the DVD.

The recording DVD disks are categorized into a plurality of types, namely, DVD+R, DVD-R, DVD+RW, DVD-RW, DVD-RAM, etc. Here, DVD+R as a write-once type medium and DVD+RW as a rewritable medium are discussed below.

When a disk, such as DVD+R or DVD+RW, is loaded in a disk drive apparatus (recording apparatus), information unique to the disk is read from address in pre-groove (ADIP) information engraved in wobbling groove on the recording surface of the disk. The apparatus thus recognizes a DVD+R disk or a DVD+RW disk. The recognized disk, discharged from the recording apparatus after a recording operation, may be loaded again in the recording apparatus later. In this case, the disk may be loaded in the same recording apparatus, or may be loaded in another recording apparatus for data exchange.

The logical format of the DVD is arranged to assure recording compatibility and replay compatibility taking into consideration a variety of usages.

Figure 1:
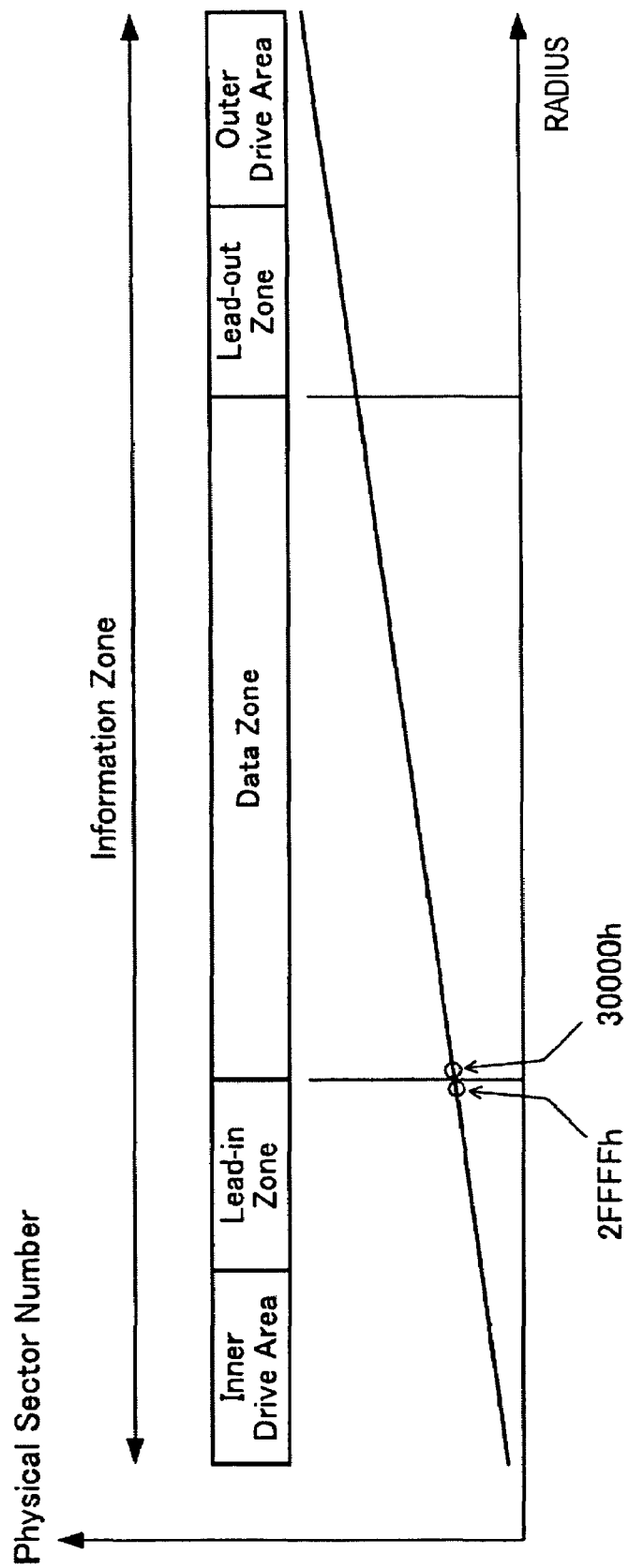
FIG. 1 illustrates a PSN of the area structure of a disk.

FIG. 1 illustrates the layout of a recording layer employed in the DVD+R disk and the DVD+RW disk.

As shown, an information zone is formed from an inner circle to an outer circle on the disk in the logical data layout in the recording layer of the DVD+R disk and DVD+RW disk. The information zone contains all information required to assure the data recording compatibility and the data replay compatibility.

The information zone in the DVD+R disk includes one or a plurality of sessions.

The information zone mainly contains the following five areas: an inner drive area, a lead-in zone (also referred to as a lead-in area), a data zone (also referred to a data area), a lead-out zone (also referred to as a lead-out area), and an outer drive area.

The lead-in zone, the data zone, and the lead-out zone are located in an area accessible by a replay only apparatus.

The inner drive area and the outer drive area are reserved for a recording only apparatus. To form a correct record mark in the recording of information, power of laser must be adjusted during recording. To this end, a test zone for use in test recording to determine optimum recording conditions and an area recording management information relating to the recording conditions are formed in each of the inner drive area and the outer drive area. Since the recording condition becomes non-uniform due to the test recording, there is no guarantee that the test zone is accessed by the replay only apparatus without any difficulty. The test zone is thus arranged in an area inaccessible by the replay only apparatus.

A physical sector number (PSN) is imparted as information indicating absolute position on the disk.

As shown, the PSN increases in a radial direction from an inner circle to an outer circle. In the case of the DVD+R disk and the DVD+RW disk, PSN=2FFFFh (h means a hexadecimal representation) is the end of the lead-in zone, and the data zone starts with PSN=30000h.

The user data is written onto the data zone, and the management information is written onto the lead-in zone. Dummy data is written onto the lead-out zone to maintain compatibility with a replay only disk. In the DVD+RW disk, the management information having the same content as the lead-in zone may be written onto the lead-out zone.

The entire information zone permits data to be written thereon. A wobbling groove is formed as a recording track in the area of the information zone. By performing a tracking operation along a groove, a track is appropriately traced in an unrecorded area having no pits (a phase change pit mark in the DVD+RW disk and a dye change pit mark in the DVD+R disk).

The ADIP information is recorded by wobbling a groove. The physical sector number (PSN) is recorded as an ADIP address in the information zone. The ADIP information recorded includes physical format information referred to as physical format information (PFI) in addition to the ADIP address.

To assure compatibility with a replay only disk, recording must be ended with a session structure of a lead-in zone, the data zone with no unrecorded portion remaining, and the lead-out zone.

In the write-once medium, such as the DVD+R disk, an appropriate management method is recorded in a lead-in zone when a session (or the entire disk) is closed in succession to the writing of the user data onto the data zone. This medium is thus replayable on another recording apparatus. In other words, a disk in an non-closed state (open state) has no appropriate management information written onto the lead-in zone, and offers no replay compatibility.

If no further writing is performed with the required writing completed, and with a close process then performed on the disk, replay compatibility is assured. In this case, no new writing cannot be performed. On the other hand, a disk in the open state thereof provides no replay compatibility, while allowing new data to be written thereon.

Recording ended with a session structure of the lead-in zone, the data zone with no unrecorded portion remaining, and the lead-out zone means performing a close process.

This leads to the problem unique to the write-once type disk that the unrecorded portion is permanently unusable even if the remaining portion is unrecorded once recording is ended with the session structure on the DVD+R disk.

A multi-session layout has been introduced to cope with this problem. The multi-session layout overcomes the problem of a single session layout that an unrecorded remaining portion remains unusable, while assuring replay compatibility by applying a slight modification to a replay only apparatus. Even after a session is closed, a next session is allowed to be written. The unrecorded portion is thus usable.

When compatibility of the DVD+RW disk with a replay only disk is desired (when the DVD+RW disk is enabled on a replay only apparatus), a finalize process is performed, the management information in the lead-in zone is updated, and the lead-out zone is formed. A resulting structure is shown in FIG. 1.

In a rewritable disk, such as the DVD+RW disk, recording of new data is possible by erasing even if the disk is finalized.

The management information recorded on the lead-in zone is described below.

The management information of the disk is recorded on the lead-in zone (lead-in area). Recorded as the management information are the disk physical format information, and file management information such as the user data recorded on the disk. For example, in the write-once type medium, such as the DVD+R disk, the management information is written on the lead-in zone at the moment the user data is finalized in the session close process (or a disk close process). In the rewritable disk, such as the DVD+RW disk, the management information is recorded on the lead-in zone when the user data is finalized in the finalize process. Since the disk is rewritable, lead-in writing (updating) may be performed at disk unloading, at user data writing, or other times. When to perform the lead-in writing is determined by a disk writing application software program initiated in a host apparatus.

The management information written on the lead-in zone in the DVD+R disk and the DVD+RW disk has a data structure shown in FIG. 2.

As shown in FIG. 2, address positions are listed at a first PSN and the size of data is represented in the number of sectors in the structure of the management information in the lead-in zone.

Arranged in the lead-in zone except a reserved (undefined) area are an initial zone, an inner disk test zone, an inner drive test zone, a guard zone 1, an inner disk identification zone, a reference code zone, a buffer zone 1, a control data zone, and a buffer zone 2.

The content of the PFI of the previously discussed ADIP information is recorded on the control data zone. The PFI includes a first PSN of the data zone, a maximum PSN of the data zone, and a maximum PSN of layer 0.

A disk control block (DCB) is contained in the inner disk identification zone. The DCB is arranged to add record compatibility information to the structure of the disk.

A two-layer DVD having two recording layers is described below. In this disk, two layers, each made of a dye change material or a phase change material, are laminated with a relatively narrow distance permitted therebetween.

FIG. 3 diagrammatically illustrates a disk 1 having two layers, namely, layer 0 and layer 1, laminated.

During recording of the two-layer disk, a laser beam output through a objective lens 3a from an optical pickup 3 of the disk drive apparatus is focused on any of the recording layer to record a signal on that recording layer.

Two recording methods, namely, a parallel track path and an opposite track path are contemplated in the two-layer disk.

Figure 4A:
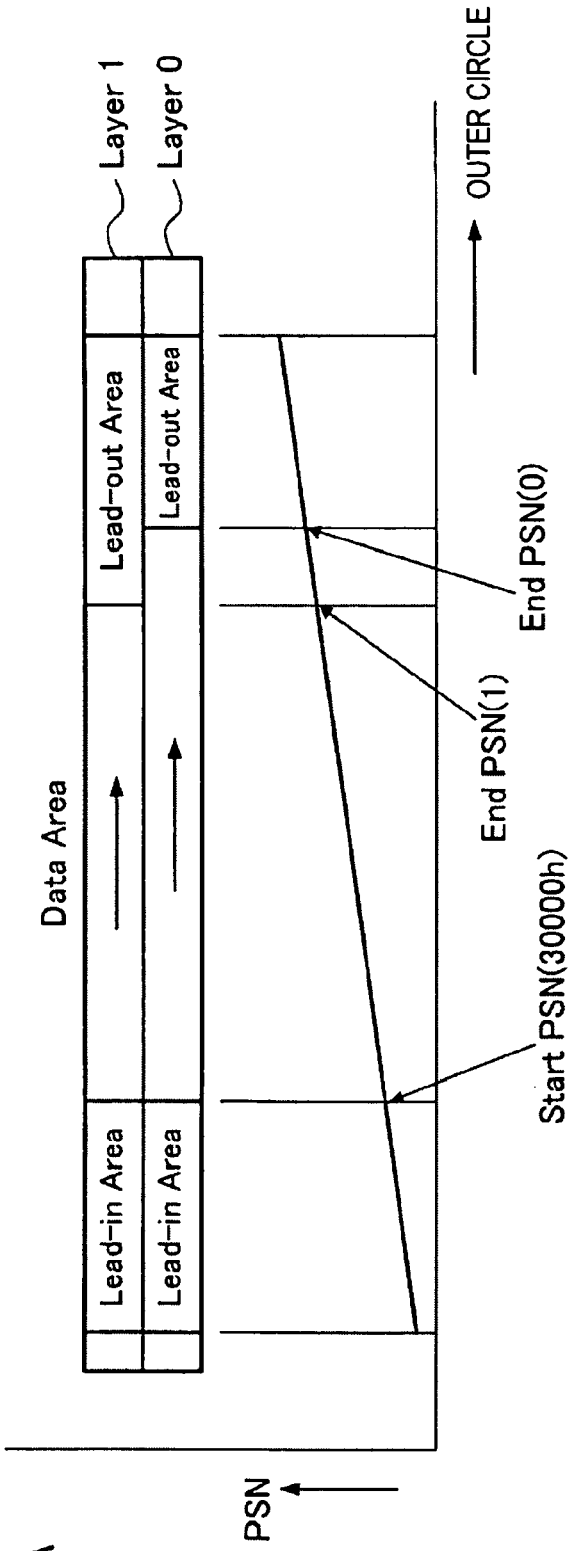
FIGS. 4A and 4B illustrate a parallel track path of the disk.
Figure 4B:
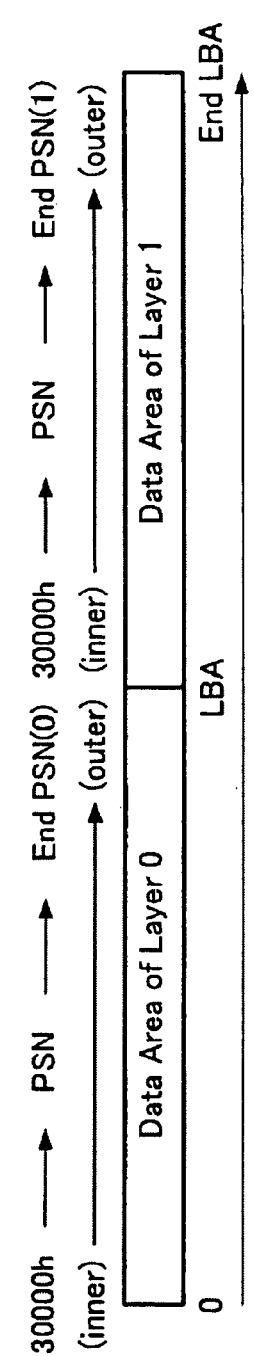

FIGS. 4A and 4B illustrate the parallel track path recording method.

As previously discussed, the physical sector number (PSN) is a physical address recorded on the disk surface. In contrast, a logical block address (LBA) is an address assigned to a chain of logical data handled by a computer. The PSN has a one-to-one correspondence to the LBA.

In the parallel track path shown in FIG. 4A, the lead-in zone, the data zone, and the lead-out zone are formed from an inner circle to an outer circle in each of layer 0 and layer 1.

The recording of the data starts with start PSN(=30000h) in the inner circle of layer 0, and continues to end PSN(0) at the end of the data area. In succession, the recording is performed from start PSN(=30000h) in the inner circle in layer 1 to end PSN(1) in the outer circle in layer 1.

As shown in FIG. 4B, the logical block addresses LBA are successively assigned in a direction from the inner circle to the outer circle in layer 0 and in a direction from the inner circle to the outer circle in layer 1.

Figures 5A, 5B:
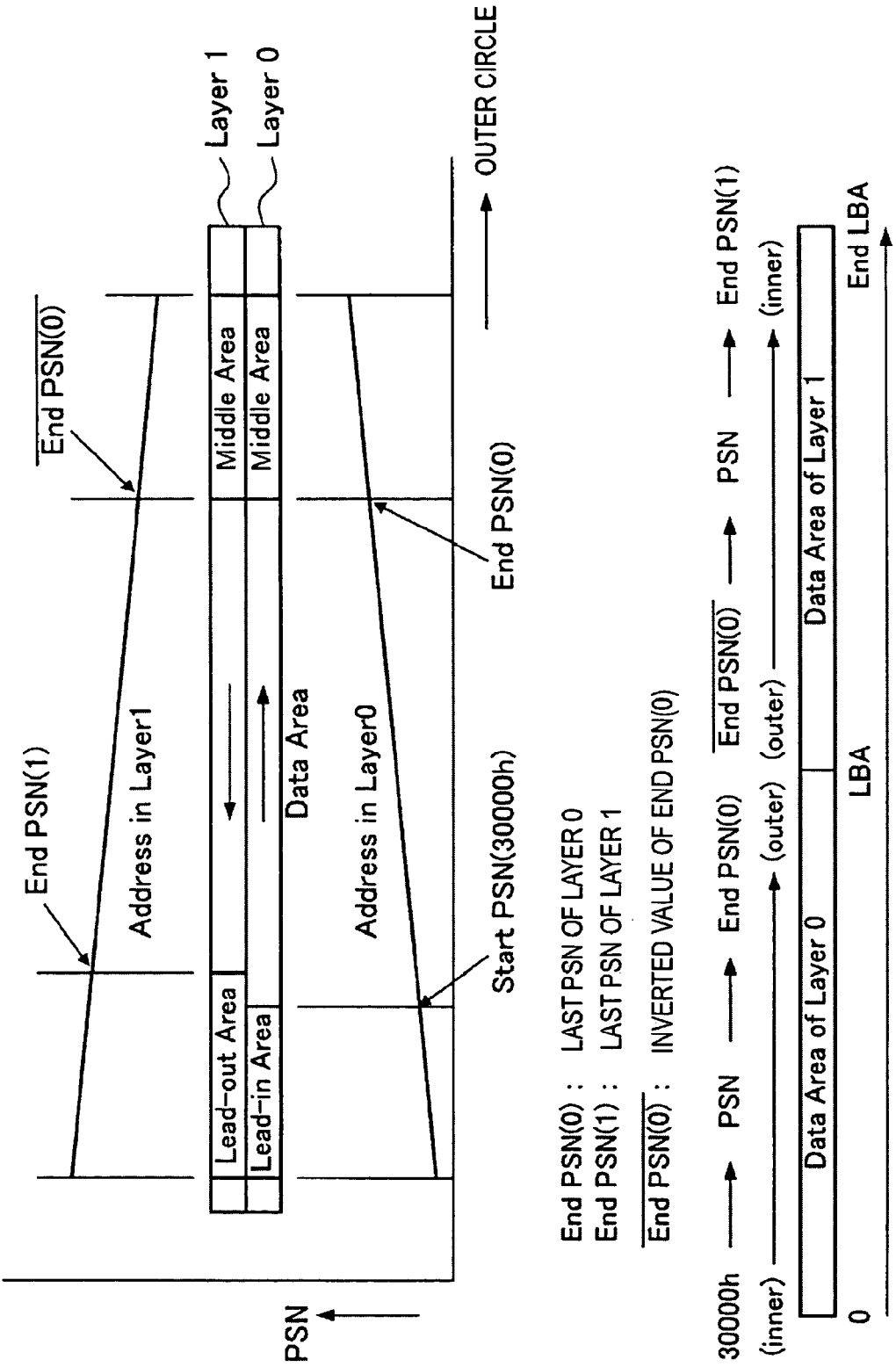
FIGS. 5A and 5B illustrate an opposite track path of the disk.

FIGS. 5A-5B illustrate an opposite track path. In a disk having the opposite track path, the recording operation is performed from an inner circle in layer 0 to the end of layer 0, and is then performed from an outer circle to an inner circle in layer 1.

As shown in FIG. 5A, the lead-in zone, the data zone, and the middle zone are formed from the inner circle to the outer circle in layer 0 in the opposite track path. Furthermore, the middle zone, the data zone, and the lead-out zone are formed from the outer circle to the inner circle in layer 1.

Data recording starts with start PSN(=30000h) in the inner circle in layer 0 and continues to end PSN(0) as the end of data area in layer 0. In succession, data recording is performed from the outer circle (inverted end PSN(0)) of the data area to the end PSN(1) in the inner circle in layer 1.

As shown in FIG. 5B, the logical block addresses LBA are assigned to the circles from the inner circle to the outer circle in layer 0. In layer 1, the assignment direction is turned so that the logical block addresses are then successively assigned to circles from the outer circle to the inner circle in layer 1.

The parallel track path and the opposite track path are different in the physical arrangement method (order) of data.

In the opposite track path, a middle area is attached to a circle outside the turning of the address assignment direction between the layers. In the case of the opposite track path, the lead-in zone is formed in layer 0, and the lead-out zone is formed in layer 1. The lead-in zone and the lead-out zone are not formed in a circle outside the data area. The replay only apparatus reads pits recorded in the disk surface, and is unable to read data in a pit free area where no servo functions. For this reason, a guard area is required. The middle area is formed in the outer circle. For example, dummy data is recorded on the middle area, serving the same purpose as the lead-out zone.

A disk drive apparatus (recording and replay apparatus) of the preferred embodiment of the present invention corresponding to the disk 1 (of two-layer DVD+R disk or DVD+RW disk) will now be discussed with reference to FIG. 6.

Figure 6:
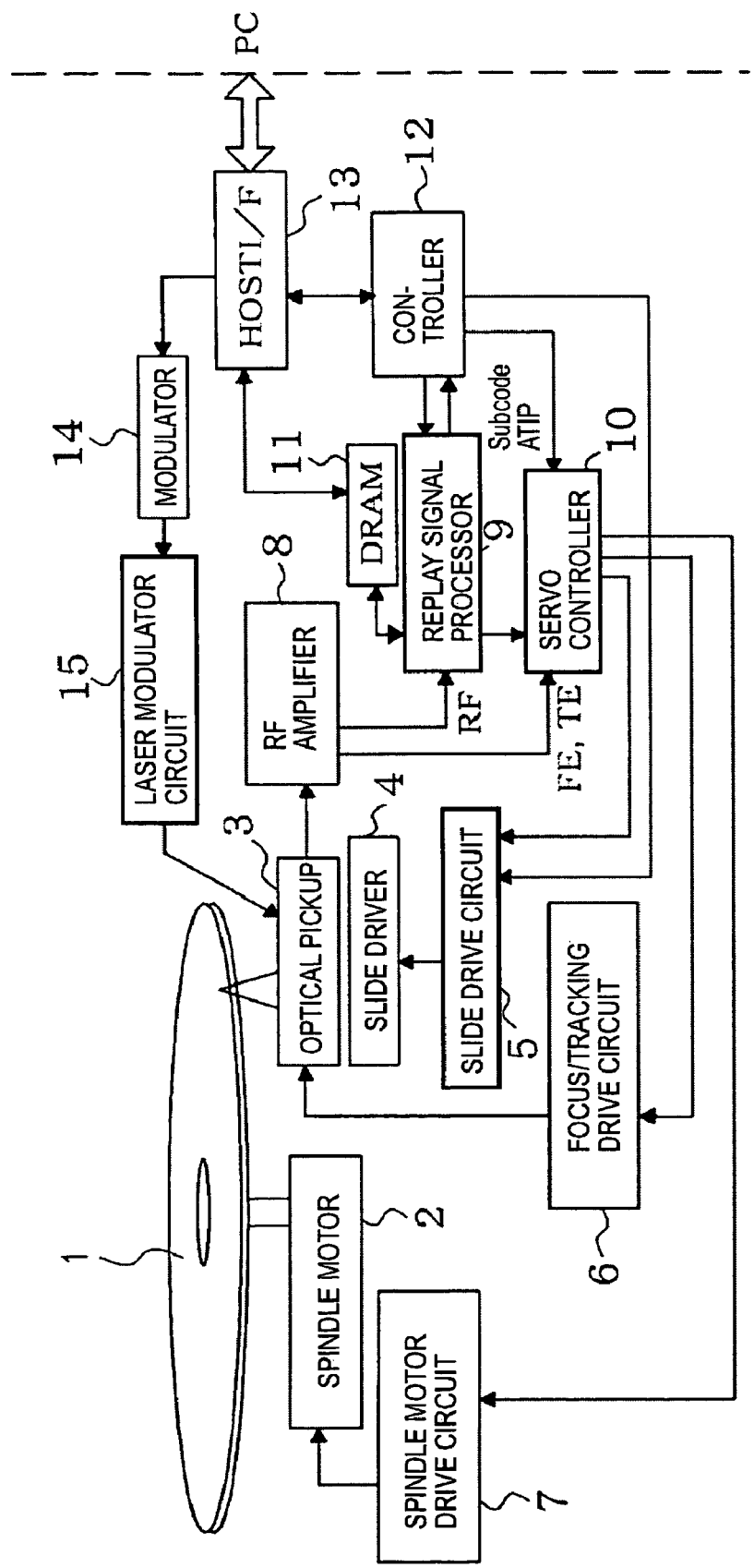
FIG. 6 is a block diagram of a recording and replay apparatus of one preferred embodiment of the present invention.

FIG. 6 is a block diagram of major portions of the disk drive apparatus of the preferred embodiment of the present invention.

A disk 1, mounted on a turn table (not shown), is rotated by a spindle motor 2 during recording and replay operations at a constant linear velocity (CLV) or a constant angular velocity (CAV). An optical pickup 3 reads data which is recorded on the disk 1 in the form of an emboss pit, a dye change pit, or a phase change pit.

The optical pickup 3 includes a laser diode serving as a laser light source, a photodetector for detecting reflected light, an objective lens serving as an output end of a laser light beam, an optical system that direct the laser light beam to a disk recording surface through the objective lens, and guides the reflected laser beam to the photodetector, and a two-axis mechanism for moving and holding the objective lens in a tracking direction and in a focusing direction.

The entire optical pickup 3 is movable in a radial direction by a slide driver 4.

The laser beam reflected from the disk 1 is detected by the photodetector. The photodetector thus converts the input light beam into an electrical signal and supplies an RF amplifier 8 with the electrical signal.

The RF amplifier 8 includes a current-voltage converter circuit and a matrix calculator and amplifier circuit responding to output currents output from a plurality of photodetectors in the optical pickup 3. Through matrix calculation, the RF amplifier 8 generates required signals. For example, an RF signal as replay data, a focus error signal FE for servo control, and a tracking error signal TE are generated.

The replay RF signal output from the RF amplifier 8 is fed to a replay signal processor 9, the focus error signal FE and the tracking error signal TE are fed to a servo controller 10.

The replay signal processor 9 performs a binarized process, a PLL lock process, EFM and 8/16 decode process, and error correction process on the replay RF signal obtained from the RF amplifier 8.

The replay signal processor 9 performs the decode process and the error correction process using a DRAM 11. The DRAM 11 stores data obtained from a host interface 13, and serves as a cache for transferring data to a host computer.

The replay signal processor 9 stores decoded data in the DRAM 11 as a cache memory.

Data buffered in the DRAM 11 is read and transferred as a replay output from the disk drive apparatus.

The replay signal processor 9 extracts subcode information, ATIP information, LPP information, ADIP information, and sector ID from information, into which the RF signal is EFM decoded and error corrected, and these pieces of information are fed to a controller 12.

The controller 12 includes a microcomputer and generally controls the entire apparatus.

The host interface 13 is connected an external personal computer serving as a host apparatus, and communicates replay data and read/write commands with the host apparatus.

The replay data stored in the DRAM 11 is transferred to the host apparatus through the host interface 13.

The read/write commands, recording data, and other signals from the host apparatus are buffered in the DRAM 11 through the host interface 13, or are fed to the controller 12.

With the write command and the recording data supplied from the host apparatus, recording is performed on the disk 1.

During the data recording, the recording data buffered in the DRAM 11 is processed by a modulator 14 for recording. More specifically, the modulator 14 attaches the error correction code, and performs EFM modulation on the recording data.

The recording data thus modulated is fed to a laser modulator circuit 15. The laser modulator circuit 15 drives a semiconductor laser in the optical pickup 3 in response to the recording data, and provides a laser beam output in response to the recording data to write the data onto the disk 1.

During the recording operation, the controller 12 controls the optical pickup 3 so that the optical pickup 3 directs a laser light beam at power for recording to the recording area of the disk 1.

If the disk 1 is of a write-once type having a dye change film as a recording layer, a dye change pit is formed in response to laser irradiation of the recording power.

If the disk 1 is of a rewritable type having a phase change film, the crystal structure of the recording layer changes in response to heating by laser, thereby forming a phase change pit. Various data is thus recorded in response to the presence or absence of a pit and the length of the pit. If the laser beam is directed to a location of the pit again, the crystal structure that has changed during data recording is restored to the original state, the pit disappears, and the data is thus erased.

A servo controller 10 receives the focus error signal FE and the tracking error signal TE from the RF amplifier 8, and a spindle error signal SPE from the replay signal processor 9 or the controller 12, and generates various servo drive signals for focusing, tracking, sliding, and spindle to perform a servo operation.

More specifically, the servo controller 10 generates a focus drive signal and a tracking drive signal in response to the focus error signal FE and the tracking error signal TE, and feeds the focus drive signal and the tracking drive signal to a focus/tracking drive circuit 6. The focus/tracking drive circuit 6 drives a focus coil and a tracking coil of the two axis mechanism of the optical pickup 3. In this way, the optical pickup 3, the RF amplifier 8, the servo controller 10, the focus/tracking drive circuit 6, and the two-axis mechanism form a tracking servo loop and a focus servo loop.

To switch on focus servo, a focus search operation must be performed. In the focus search operation, a location where a shape S curve of the focus error signal FE results is detected by forcing the objective lens to move with the focus servo off. As is known, a linear segment of the shape S curve of the focus error signal is a range where the objective lens is drawn to an in-focus position with the focus servo loop closed. While the objective lens is forced to move in the focus search operation, the range within which the object lens is drawn to the in-focus position is detected. At that timing, the focus servo is switched on. The focus servo operation is thus performed with a laser spot maintained at the in-focus position.

The disk 1 has the two-layer structure of layer 0 and layer 1 in the preferred embodiment of the present invention.

To record data on or replay data from layer 0, the laser light beam is focused on layer 0. To record data on or replay data from layer 1, the laser light beam is focused on layer 1.

A focus jump operation is performed to shift the focus position from layer 0 to layer 1.

In the focus jump operation, the focus servo is switched off with the objective lens focused on one layer, and the objective lens is forced to move. At the moment the objective lens reaches the focus drawn range of the other layer (at the moment the shape S curve is observed), the focus servo is switched on.

The servo controller 10 supplies the spindle motor drive circuit 7 with the spindle drive signal that is generated in response to the spindle error signal SPE. The spindle motor drive circuit 7 feeds a three-phase drive signal to the spindle motor 2 in response to the spindle drive signal, thereby rotating the spindle motor 2. The servo controller 10 generates a spindle drive signal in response to a spindle kick/brake control signal from the controller 12. In response, the spindle motor drive circuit 7 causes the spindle motor 2 to start, stop, accelerate, and decelerate.

The servo controller 10 generates a slide error signal based on a low-frequency component of the tracking error signal TE, and a slide drive signal based on an access control of the controller 12, and supplies a slide drive circuit 5 with the slide error signal and the slide drive signal. The slide drive circuit 5 operates a slide driver 4 in response to the slide drive signal. The slide driver 4 includes a mechanism (not shown), including a main shaft, a sled motor, transmission gears, etc., for holding the optical pickup 3. The optical pickup 3 is slid to a desired location when the slide drive circuit 5 drives the slide driver 4 in response to the slide drive signal.

The recording process of the user data on the two-layer disk in the disk drive apparatus is described below.

As previously discussed, the close (finalize) process is performed on the disk 1 subsequent to the recording of the user data, thereby appropriately forming the lead-in zone, the lead-out zone, and the middle area. Replay compatibility is thus assured.

When the user data is recorded on the two-layer disk without performing the closed process, appropriate replaying of layer 1 is difficult as previously discussed.

In the recording process of the preferred embodiment of the present invention, the replay operation is allowed to be properly performed even prior to the close process even if recording layer shifting is performed in the middle of the recording of the user data.

Figure 7:
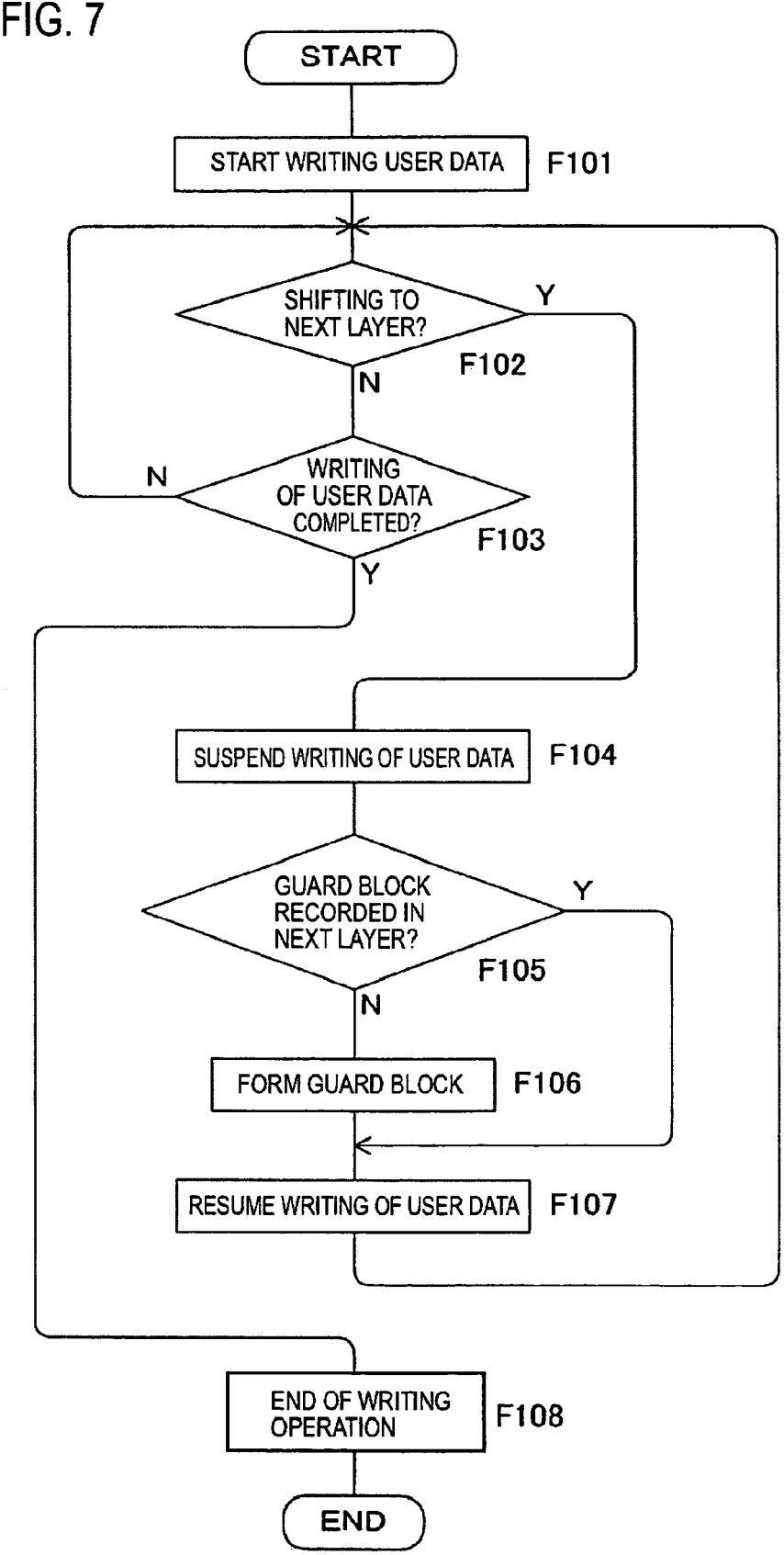
FIG. 7 is a flowchart of a user data recording process in accordance with the preferred embodiment of the present invention.

FIG. 7 illustrates the process of the controller 12 that records the user data. The process of the controller 12 is discussed below with reference to FIG. 8. As shown, the disk 1 is an opposite track path type in this case.

As shown in FIG. 7, the controller 12 starts the user data recording in step F101.

Before starting the user data recording, dummy data is recorded to form a buffer region (guard block) having a predetermined size. In succession, the user data is recorded.

In step F102, the controller 12 determines whether or not to perform recording layer shifting. The controller 12 performs layer shifting to layer 1 when the user data recording is in progress, and reaches the maximum address that can record user data in layer 0. Even if the maximum address is not yet reached, shifting to layer 1 may be performed in response to an instruction from the application for executing the recording process, or an instruction from the host apparatus, or in accordance with a predetermined program.

In step F103, the controller 12 monitors whether the writing of the user data is completed.

If the controller 12 determines in step F103 that the writing operation is completed without layer shifting after the user data writing starts at an address of layer 0, the controller 12 performs a recording end process in step F108. This operation coincides with the end of the user data recording in layer 0 in response to an instruction from the host apparatus. A similar operation is also performed in the case when the user data recording starts at an address in layer 1 and the recording of the user data is determined in step F103 to be complete. This recording end process in layer 1 is performed in response to an instruction from the host apparatus.

When layer shifting to layer 1 is performed in step F101 in the middle of the user data recording in layer 0, the algorithm proceeds to step F104. The user data recording operation is suspended temporarily. In step F105, the controller 12 determines whether a guard block is formed in the destination layer 1. For example, the focus jumping is performed to layer 1, an area immediately ahead of the location where the user data recording resumes is replayed, and the controller 12 determines whether the area has already undergone data recording.

At this point of time, no guard block is typically formed. The algorithm proceeds to step F106 to perform a guard block formation process. For example, to form the guard block, the dummy data is recorded in an area immediately ahead of an address in layer 1 where the user data recording resumes.

At the moment the recording process of the guard block reaches the address where the user data recording resumes, the controller 12 allows the user data recording to resume at that address in step F107.

The algorithm loops to steps F102 and F103 after the user data recording resumes. In the case of the two-layer disk, no further layer shifting is performed. At the end of the user data, the controller 12 determines in step F103 that the writing of the user data is completed. The controller 12 performs the user data writing end process in step F108.

A disk having three or more layers may be used as will be discussed later. In that case, layer shifting may be performed in step F102 after a preceding layer shift. Steps F104-F107 may also be performed.

The process of FIG. 7 is described with reference to FIGS. 8A-8C. User data DA1-DA9 are recorded in response to an instruction from the host apparatus.

For example, the user data recording in step F101 now starts at address Ad1 in layer 0 as shown in FIG. 8A. Data DA1, DA2, . . . are successively recorded.

As shown in FIG. 8B, the data recording is performed up to DA6. At the moment the data recording reaches an address Ad2, shifting to layer 1 is performed.

In layer 1, data DA7 is recorded at an address Ad4. In step F106, the dummy data is recorded at addresses Ad3 and Ad4, thereby forming the guard block GB. When the dummy data recording reaches the address Ad4, the recording of the data DA7 starts. The user data recording continues up to data DA9. When the recording of data DA9 is completed at the address Ad5, the recording of the user data instructed by the host apparatus is completed. The controller 12 determines in step F103 that the writing of the user data ends, and performs the writing end process in step F108.

When the recording of the user data is shifted from layer 0 to layer 1, the guard block GB is first recorded in the destination layer 1, followed by the recording of the user data (DA7-DA9).

As represented by an arrow mark REC of FIGS. 8A-8C, the recording operation is performed from the address Ad1 to the address Ad2 in layer 0 and then from the address Ad3 to the address Ad5 in layer 1.

When the user data recording is performed as shown in FIG. 8C, the close (finalize) process is not yet performed, and the lead-in zone, the lead-out zone, and the middle area are not yet formed.

The replaying of the user data is performed at this point of time.

As in the conventional art, the replaying of the user data DA1-DA6 in layer 0 is free from any problem in the preferred embodiment of the present invention. This is because the guard block, although not shown in FIGS. 8A-8C, is formed immediately ahead of front data when the user data is recorded.

For example, when the address Ad1 is start PSN (=30000h) of FIG. 5, the guard block is formed by recording the dummy data in a buffer zone 2 (see FIG. 2) at the end of the lead-in zone. When current user data recording is performed with the user data already recorded, current user data is recorded in succession to the recorded area. Even in such a case, the guard block of a predetermined amount is formed, followed by the recording of the current user data.

When the data DA1 is replayed, a replay signal is obtained from an area immediately ahead thereof. The pre-replay processes are thus performed. For example, the RF amplifier 8 performs gain adjustment, and the replay signal processor 9 performs PLL looping, and a synchronization clock replay process. The data DA1 is thus appropriately replayed.

The data DA7-DA9 recorded in layer 1 is also appropriately replayed in the preferred embodiment of the present invention. More specifically, a replay signal is obtained from the guard block GB immediately ahead of the data DA7 when the data DA7 is replayed. The pre-replay process is thus enabled. When the replay signal is obtained from the data DA7, the replay signal processor 9 is thus enabled to perform a normal decode process.

The apparatus could malfunction in the replaying of the data stored in layer 1 before the close (finalize) process in the two-layer disk. With the process of the preferred embodiment of the present invention performed, the apparatus is free from such malfunction.

The guard block GB recorded prior to the recording of the user data in layer 1 constitutes part of the middle area after the close (finalize) process is performed.

Another user data recording process will now be discussed with reference to FIGS. 9 and 10A-10C.

Figure 9:
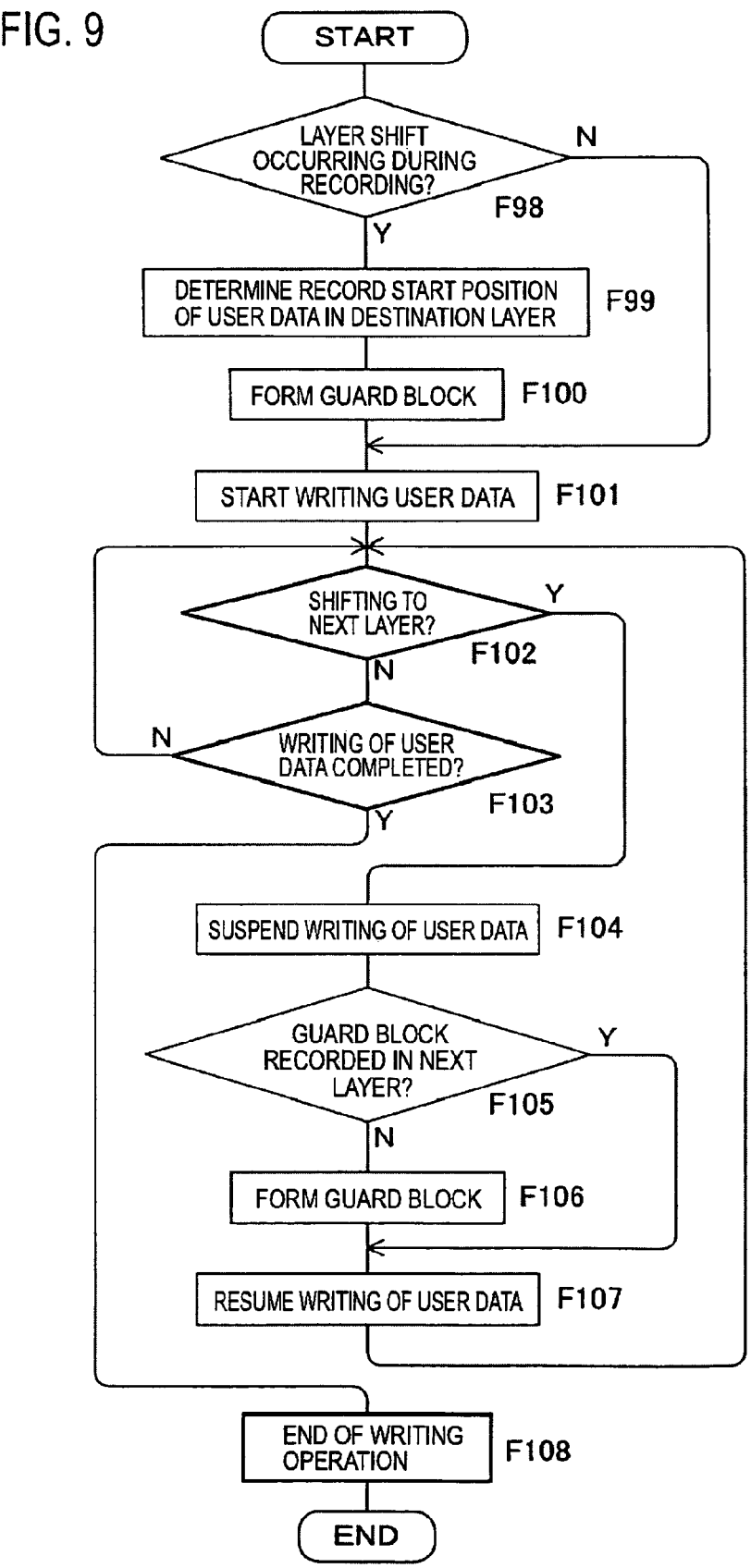
FIG. 9 is a flowchart of another user data recording process in accordance with the preferred embodiment of the present invention.

FIG. 9 illustrates the user data recording process of the controller 12. As shown, steps identical to those discussed with reference to FIG. 7 are designated with the same step numbers. In the process of FIG. 9, steps F101-F108 are identical to those of FIG. 7.

In the process of FIG. 9, steps F98-F100 are performed prior to the start of the user data recording in step F101.

Before starting the user data recording, the controller 12 predicts in step F98 whether layer shifting is to occur in the middle of the current user data recording.

This prediction is performed based on the address at which the current recording starts and the amount of user data to be recorded.

One condition causing layer shifting is that a start address of recording is not an address in the final layer (not layer 1 in the two-layer disk). For example, one condition causing the layer shifting in the case of the two-layer disk is that the current user data recording starts at an address in layer 0. The amount of user data to be recorded is known from information contained in a command from the host apparatus. For example, if the amount of the user data to be recorded in the disk 1 is known, the host apparatus notifies the controller 12 of the amount of the user data. If the controller 12 learns the amount of the user data from the command from the host apparatus, the controller 12 performs a calculation from the recording start address and determines whether or not layer shifting is to occur. More specifically, if the available capacity in layer 0 is larger than the amount of the user data at that point of time, the controller 12 determines that layer shifting is to occur. If the amount of the user data is accommodated in layer 0 only, no layer shifting occurs.

The controller 12 determines in step F98 that layer shifting is to occur in the middle of the user data recording.

If it is determined that layer shifting is to occur, the algorithm proceeds to step F99.

If it is determined that layer shifting is not to occur, or if the determination in step F98 is difficult to perform, the algorithm proceeds to step F101. The process in step F101 and subsequent steps is identical to the process of FIG. 7.

In step F99, the controller 12 determines a record start position of the user data in the next layer (layer 1).

For example, the controller 12 calculates last address of the user data in layer 0 from the amount of the user data to be recorded in layer 0. An address in layer 1, corresponding to last address in layer 0, is set to be a record start address of the user data in layer 1. For example, an address to which the focus jump is performed to layer 1 from last address of the user data in layer 0 becomes the record start address.

Upon detecting the record start address of the user data in the next layer (layer 1), the controller 12 performs a guard block formation process in step F100. More specifically, the dummy data is recorded in an area within a predetermined range immediately ahead of the record start address in layer 1 to form the guard block.

The algorithm proceeds to step F101 after the guard block is formed. After starting the user data recording, step F101 and subsequent steps are identical to the steps in FIG. 7.

If layer shifting is actually performed in the process in step F101 and subsequent steps, the algorithm proceeds to steps F104-F107. If the guard block GB is already formed in step F100, the process in step F106 is skipped.

FIGS. 10A-10C illustrate the user data recorded in the process of FIG. 9.

FIG. 10A illustrates the guard block GB that is formed subsequent to the detection of the layer shifting and the record start address of the user data in the destination layer in steps F98-F100. For example, if the address Ad4 is the record start address of the user data in layer 1, the dummy data is recorded in the addresses Ad3-Ad4, thereby forming the guard block GB.

If the user data recording starts at the address Ad1 in layer 0 in step F101, the user data DA1, DA2, . . . are successively recorded as shown in FIG. 10B. At the moment the data recording reaches the address Ad2 with up to the data DA6 recorded, layer shifting is performed. Since the guard block GB is already recorded in layer 1, the data recording starts with the data DA7 at the address Ad4 as shown in FIG. 10C. The data recording is performed to the data DA9, and the recording operation is thus completed.

If layer shifting from layer 0 to layer 1 is predicted prior to the recording of the user data in the process of the preferred embodiment of the present invention, the guard block GB is recorded in layer 1 prior to the start of the user data recording. The user data (DA1-DA9) is then recorded on layer 0 and layer 1.

As represented by an arrow mark REC in FIGS. 10A-10C, the guard block is formed in addresses Ad3-Ad4 in layer 1. The user data is then recorded from address Ad1 to address Ad2 in layer 0, and from address Ad4 to address Ad5 in layer 1.

With the guard block GB formed in layer 1, the replay of the user data is performed without any problem as in the process of FIG. 7.

Since the recording of the guard block GB is not performed in the middle of the recording of the user data, the user data can be transferred from the host apparatus at a high data rate.

The guard block GB is formed under the conditions that the address of layer 1 corresponding to the record end address in layer 0 becomes the record start address in the opposite track path, two-layer disk as shown in FIGS. 8A-8C, and FIGS. 10A-10C.

The guard block GB arranged in other structures will now be discussed.

Figure 11:
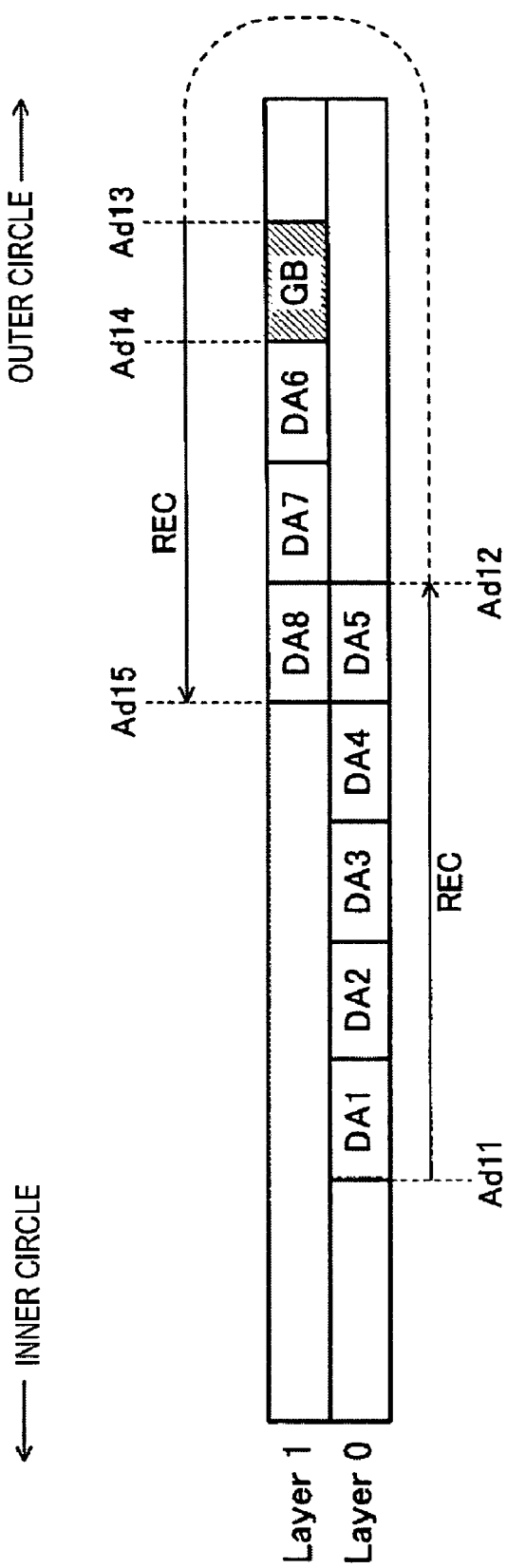
FIG. 11 illustrates the guard block in accordance with the preferred embodiment of the present invention.
Figure 14:
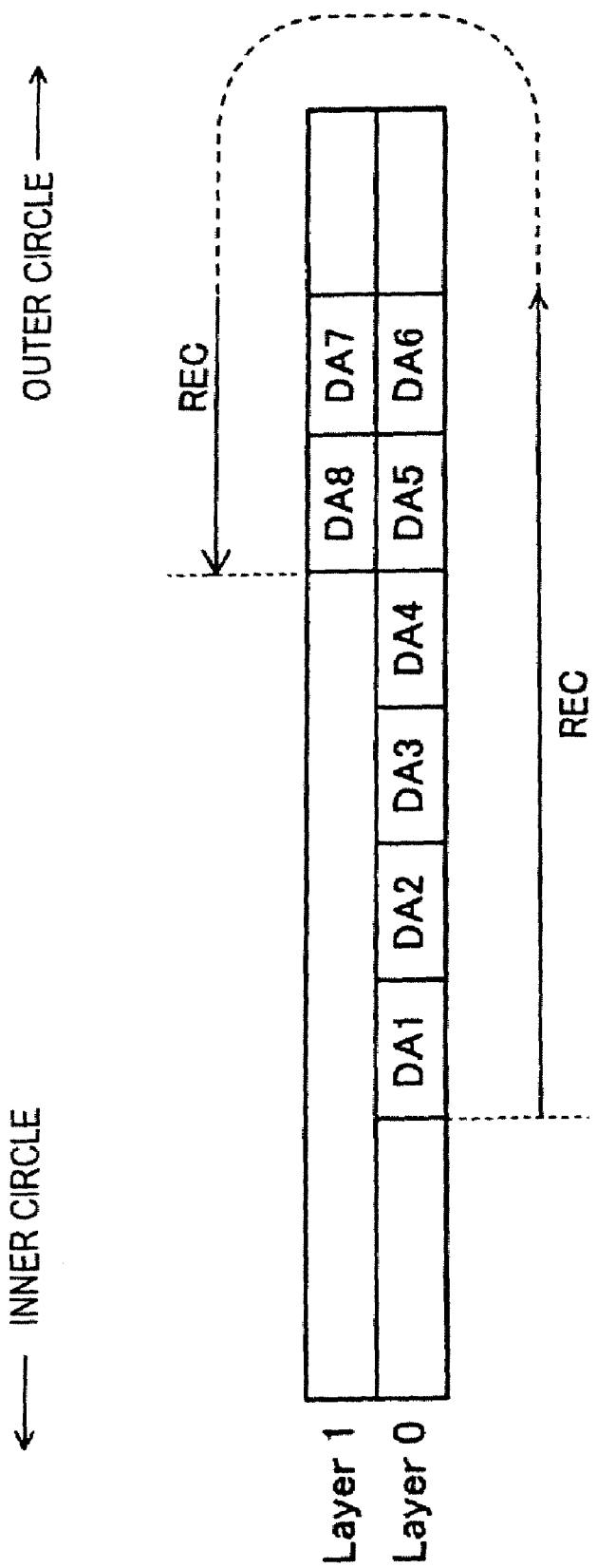
FIG. 14 illustrates the user data recorded prior to a close process.

FIG. 11 illustrates a two-layer, opposite track path disk. In this disk, the record end address in layer 0 and the record start address in layer 1 do not coincide with each other in plan view.

The user data DA1-DA5 are recorded on addresses Ad11 and Ad12 in layer 0. After layer shifting, user data DA6-DA8 are recorded on addresses Ad14 and Ad15 in layer 1. The record end address Ad12 in layer 0 and the record start address Ad14 in layer 1 are not aligned with each other in plan view.

In such a recording operation as well, the guard block GB is formed in an area immediately prior to the user data DA6, namely, within a range of addresses from Ad13-Ad14.

Even if layer shifting is performed in the middle of the user data recording from within any range of layers 0 and 1, it will be sufficient if the area immediately ahead of the record start address of the user data in layer 1 becomes the guard block GB.

FIGS. 12A and 12B illustrate the parallel track path disk.

As shown in FIG. 12A, an address Ad21 is a front of a data zone in layer 0, and an address Ad24 is a front of a data zone.

In layer 0, user data DA1-DA7 are recorded within a range of the address Ad21 as the front of the data zone to an address Ad22. After layer shifting to layer 1, the remaining data DA8 is recorded within a range of the front of the data zone (address Ad24) to an address Ad25.

As shown in FIGS. 7 and 9, the guard block GB is recorded in an area (Ad23-Ad24) immediately ahead of address Ad24. In the case of the parallel track path, a circle inner than the front of the data zone becomes a lead-in zone in layer 1. The area (Ad23-Ad24) immediately ahead of the address Ad24 is a buffer zone 2 of FIG. 2.

As shown in FIG. 12B, user data DA1-DA7 are recorded within a range from an address Ad31 as a front of the data zone to an address Ad32 in layer 0. After layer shifting to layer 1, the remaining data DA8 and DA9 are recorded within a range from an address Ad34 as an intermediate portion of the data zone to an address Ad35.

As shown in FIGS. 7 and 9, the guard block GB is recorded in an area (Ad33-Ad34) immediately ahead of address Ad34.

It is sufficient if the guard block GB is recorded immediately ahead of the record start address of the user data in layer 1 in the parallel track path as shown in FIGS. 12A and 12B.

FIGS. 13A-13C illustrate a three-layer opposite track path disk.

As shown in FIG. 13A, user data DA1-DA16 is recorded. As shown, the user data DA1-DA6 are recorded within a range from an inner circle to an outer circle in layer 0. In succession, data DA7-DA12 are recorded within a range from an outer circle to an inner circle in layer 1. Furthermore, data DA13-DA16 are recorded within a range from an inner circle to an outer circle in layer 2.

As shown in FIGS. 7 and 9, the guard block GB is recorded within a predetermined range in a circle outside the user data DA7 in layer 1, and within a predetermined range in a circle inside the user data DA13 in layer 2.

As shown in FIG. 13B, user data DA1-DA7 are recorded with the recording operation starting at the midway point of layer 1. In this case, data DA1-DA4 are recorded within a range from an outer circle to an inner circle in layer 1. After layer shifting, data DA5-DA7 are recorded within a range from an inner circle to an outer circle in layer 2.

As shown in FIGS. 7 and 9, the guard block GB is recorded within a predetermined range in a circle inner than the user data DA5 in layer 2.

If layer shifting occurs in the middle of the recording of the user data in the three-layer disk, the guard block GB is formed in an area immediately ahead of the record start position of the user data in the destination layer.

The above-referenced process is applicable to the three-layer, parallel track path disk, and four or more layer disks (of opposite track path/parallel track path).

The process of the preferred embodiment of the present invention for the formation of the guard block GB has been discussed. A variety of modifications of the present invention is contemplated.

The DVD+R disk and the DVD+RW disk as the two-layer disk have been discussed. The guard block GB may be formed in response to the layer shifting in the course of the user data recording in a DVD–R disk, a DVD–RW, and DVD-RAM, each having a plurality layers.

The present invention is applicable to not only the DVD disk, but also other type of disks including a CD disk, and a blue-ray disk. Furthermore, the present invention is applicable to media having a plurality of layers, other than disks.

What is claimed is:

1. A recording apparatus using a recording medium having a plurality of data writable recording layers, the recording apparatus comprising:
    a recording unit configured to record data onto one of the recording layers and to continuously record the data onto a next one of the recording layer; and
    a control unit configured to control the recording unit so that the recording unit records a guard block in an area reaching a recording start position of user data in the next recording layer when the recording unit continues to record the data onto the next recording layer in a recording operation of the recording unit.

2. A recording apparatus according to claim 1, wherein the control unit records the guard block on the next recording layer prior to the start of the recording of the user data in the next recording layer when the recording unit continues to record the data onto the next recording layer after the completion of the recording operation of the user data on the one recording layer.

3. A recording apparatus according to claim 1, further comprising:
    a detecting unit configured to detect the record start position of the recording of the user data in the next recording layer prior to the recording of the user data, and wherein the control unit records the guard block prior to the start of the recording of the user data based on the record start position detected by the detecting unit.

4. A recording method using a recording medium having a plurality of data writable recording layers, the recording method comprising:
    recording user data on one recording layer;
    suspending recording of user data and recording a guard block on a next recording layer after a recording position is shifted to the next recording layer with the recording of the user data on the one recording layer being completed; and
    resuming the recording of the user data after completing the recording of the guard block.

5. A recording method for using a recording medium having a plurality of data writable recording layers, the recording method comprising:
    detecting a record start position of user data on a next recording layer prior to the recording of the user data on the next recording layer when a recording position shift from one recording layer to the next recording layer is predicted in a recording operation of the user data;
    recording a guard block on the next recording layer in response to a result of the detecting; and
    resuming recording the user data across the one recording layer to the next recording layer after the recorded guard block.

6. A recording apparatus according to claim 1, wherein the control unit is further configured to predict, based on the address at which the current recording starts and the amount of user data to be recorded, whether a layer shift will occur in the middle of a current user data recording prior to the start of the recording of the user data.

7. A recording apparatus according to claim 1, wherein the control unit is further configured to determine a record start position by calculating a preceding address of the user data in a first layer from the amount of the user data to be recorded in said first layer, and setting the record start position of the user data to an address in a second layer which corresponds to the preceding address in said first layer.

8. A recording method according to claim 4, further comprising: replaying pre-replay data prior to replaying the user data, such that the user data recorded in the middle of layer shifting is properly replayed.

9. A recording method according to claim 8, wherein the replaying is performed even when recording layer shifting is performed in the middle of the recording of the user data.

10. A recording method according to claim 4, wherein, when the user data recorded in the next recording layer is replayed, a pre-replay process is performed based on a replay signal from the guard block that is replayed prior to the replaying of the user data, and the user data that recorded in the middle of layer shifting is appropriately replayed.

11. A recording method according to claim 5, further comprising:
    replaying pre-replay data prior to replaying the user data, such that the user data recorded in the middle of layer shifting is properly replayed.

12. A recording method according to claim 11, wherein the replaying is performed even when recording layer shifting is performed in the middle of the recording of the user data.

13. A recording method according to claim 5, wherein, when the user data recorded in the next recording layer is replayed, a pre-replay process is performed based on a replay signal from the guard block that is replayed prior to the replaying of the user data, and the user data that recorded in the middle of layer shifting is appropriately replayed.

* * * * *